G. H. SCHWEDLER.
CONDUIT FITTING FOR ELECTRICAL CONDUITS.
APPLICATION FILED AUG. 5, 1912.
1,066,329.
Patented July 1, 1913.
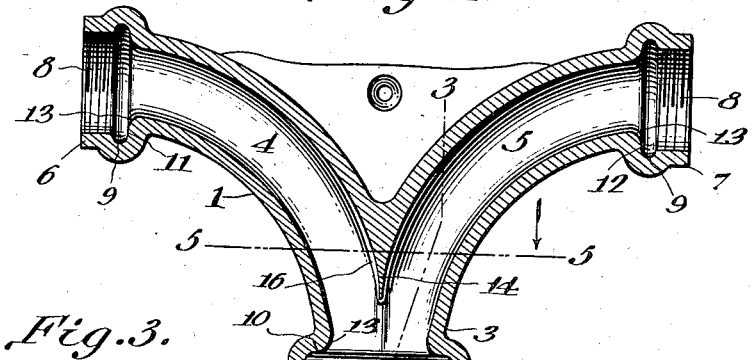
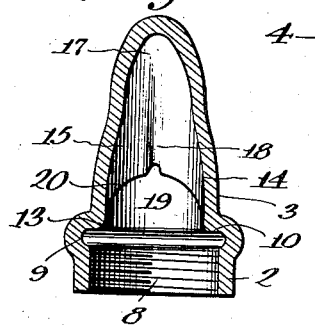
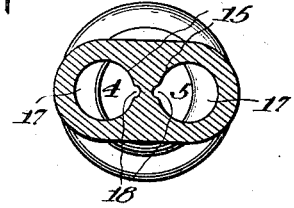
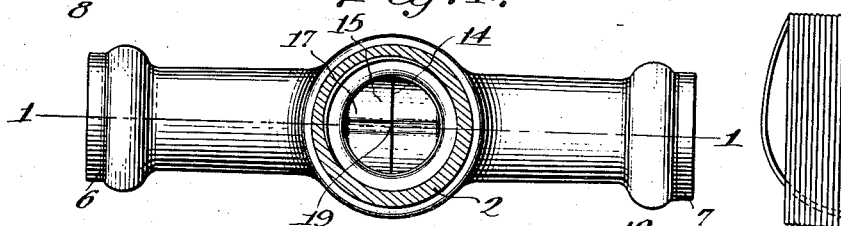
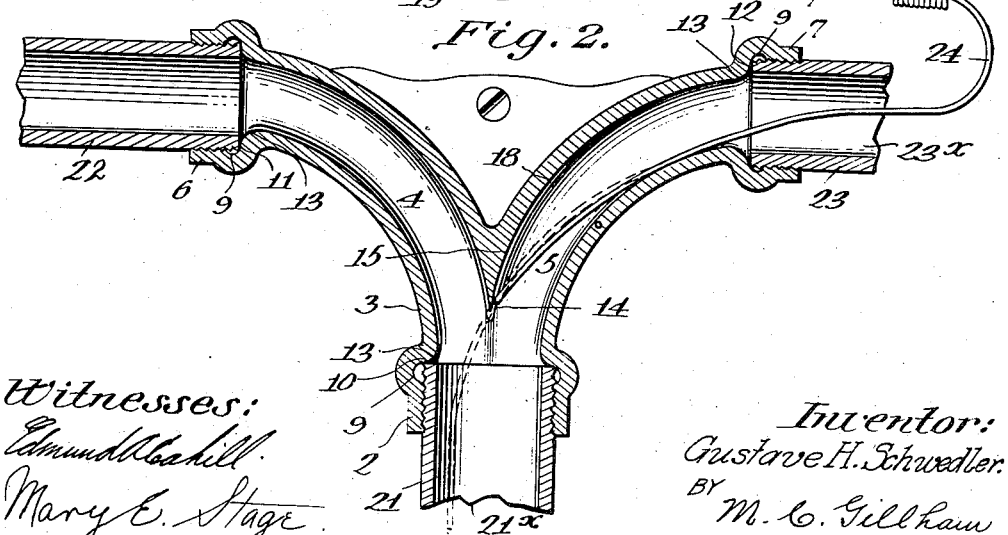
Witnesses:
Edmund A. Cahill
Mary E. Stage
Inventor:
Gustave H. Schwedler.
BY M. C. Gillham
ATTORNEY

UNITED STATES PATENT OFFICE.

GUSTAVE H. SCHWEDLER, OF KANSAS CITY, MISSOURI.

CONDUIT-FITTING FOR ELECTRICAL CONDUITS.

1,066,329.  Specification of Letters Patent.  Patented July 1, 1913.

Application filed August 5, 1912. Serial No. 713,314.

*To all whom it may concern:*

Be it known that I, GUSTAVE H. SCHWEDLER, a citizen of the United States, residing in Kansas City, in the county of Jackson and State of Missouri, have invented a new and useful Conduit-Fitting for Electrical Conduits, of which the following is a specification.

My invention relates to conduit fittings for electrical conduits by means of which electrical conduits may be connected with lateral branches and permanently concealed and through which a fish-wire may be accurately passed to engage and pull a feed-wire through the fitting and conduits connected therewith.

The objects of my invention are, first, to provide a simple, cheap and improved fitting for concealed conduit systems; second, to provide means within the fitting for directing and guiding the fish-wire therethrough; third, to provide means within the fitting for housing the ends of conduits connected therewith, to assure an unobstructed passage therethrough for the fish-wire and to prevent injury to the insulation upon feed-wires when pulled through the fitting, and fourth, to effect a saving in materials, time and expense for laying conduit systems. I attain these objects by the means and devices illustrated in the accompanying drawings in which, Figure 1. is a sectional view of the fitting on the line I—I in Fig. 4, Fig. 2. a sectional view of the fitting with conduit attached illustrating the passage of a fish-wire through the fitting, Fig. 3. a vertical view of the partition within the fitting on the line III—III in Fig. 1, and Fig. 4. an end view of the fitting on the line IV—IV in Fig. 1, and Fig. 5. a sectional view of the partition on the line V—V, in Fig. 1.

Similar numerals refer to similar parts throughout the drawing.

In the drawing the numeral 1 indicates a conduit fitting in section having a main hub 2 carried by a short neck 3 and duplex branches 4 and 5 outwardly curved from said neck 3 and carrying the hubs 6 and 7 respectively. The fitting is preferably formed of cast iron.

The main hub 2 and the hubs 6 and 7 carried by the branches 4 and 5 are each provided with internal screw-threads 8 to receive the screw ends of conduits connected with the fitting and, at the inner end of said internal screw-threads 8, an annular depression or groove 9 is formed in the inner surface of each of said hubs, for the purpose of facilitating the tapping of the internal screw-threads the full depth of the hubs, so that the ends of conduits connected with the fitting may be advanced within the hubs to shoulder against the end of the inner walls of the neck 3 and the branches 4 and 5, as hereafter will appear. The said neck 3 of the fitting is formed to have a uniform inner diameter less than the inner diameter of the main hub 2 with which it is formed, and the inner wall of the neck 3 is formed to terminate at the inner end of the hub 2 for the specific purpose of providing a butting shoulder 10 against which the end of a conduit connected with the main hub 2 may abut and be housed to prevent damage to the insulation upon a feed-wire by contact with the ends of the conduit when the feed-wire is pulled through the fitting, and also to provide an unobstructed passage for a fish-wire through the fitting when advanced therethrough to engage a feed-wire. The said branches 4 and 5 are formed to have uniform inner diameters less than the inner diameters of the hubs 6 and 7 carried by the branches and the inner walls of the branches are formed to terminate at the inner end of said hubs for the purpose of providing the butting shoulder 11 upon the branch 4 and the butting shoulder 12 upon the branch 5 against which the ends of the conduits connected with the hubs 6 and 7 may abut and be housed to prevent damage to the insulation upon the feed-wire by contact with the ends of the conduits when the feed-wire is pulled through the fitting, and to provide an unobstructed passage for the fish-wire when advanced through the fitting to engage a feed-wire. The said butting shoulder 10 upon the neck 3 and 11 and 12 upon the branches 4 and 5 are respectively rounded upwardly and inwardly for the purpose of providing a smooth bearing surface 13 adapted for slidable movements thereon of a fish-wire or a feed-wire when passed or pulled through the fitting.

It is obvious that a fitting adapted for concealment within the walls of buildings or in the earth and connecting main conduits with lateral branches, and through which a fish-wire may be expeditiously passed to engage a feed-wire must effect a considerable saving in material, time and expense when installing a conduit system, and for this purpose, and for the further purpose of providing means within the fitting for the expeditious and accurate passage therethrough of a fish-wire when fishing for a feed-wire, I have formed integral with the inner surfaces of the neck 3 and the branches 4 and 5, at the intersection of the curved walls of said branches, a novel partition 14 which is formed by the outwardly curved walls of the branches continued inwardly to a juncture and from the lower extremity of said partition outwardly receding wire guiding side portions 20 are extended in vertical line downwardly within the neck 3 approximately to the shoulder 10, as shown in Fig. 3, and provided with opposing faces 15, which faces are curved inwardly and transversely as at 17, and the portion of said faces located above the extended wire guiding side portions 20 is divided centrally by a longitudinal wire guiding depression or slot 18 to provide inward sloping side surfaces on said partition leading to the wire guiding depression or slot 18, which said depression or slot is provided with sloping sides to effect a smooth juncture thereof with the sloping surfaces on the face 15. The inward side slopes and curvatures of the faces 15 are provided for the purpose of deflecting a fish-wire traversing the fitting and impinging thereon to the wire guiding depression or slot 18 which is located, formed and adapted to engage and guide the wire through the bend in the passage in a path offering the least resistance to the passage therethrough, the said depression or slot describing the arc of a circle having the greatest radius, effects a long bend of the wire thereby reducing the friction incident to the bending and sliding process to negotiate the passage.

The side portions 20 act as a guiding and bearing surface for the fish-wire downwardly to a point near the shoulder 10 and without obstructing or reducing the passages. The faces of said side portions are provided with inwardly sloping surfaces adapted for deflecting the fish-wire inwardly and downwardly to avoid feed-wires which may have been drawn to occupy the walls of the passage. The border of said side portions being practically a continuation of the sides of the slot 18 outwardly and downwardly extended.

The novel formation of the partition 14 prevents the passage of a fish-wire from one branch of the fitting to the opposite branch and at the same time gives direction to, and guides the fish-wire with great accuracy through the fitting to the conduit below.

Assuming that the fitting described is concealed in the walls of a building and a conduit 21 is connected with the main hub 2, a conduit 22 is connected with the hub 6 carried by the branch 4, a conduit 23 is connected with the hub 7 carried by the branch 5, and all of said conduits are abutting and are housed by the shoulders 10, 11 and 12, respectively.

A fish-wire 24, consisting of a steel or other suitable wire of proper dimension and length is introduced into the conduit 23 at some opening above the fitting as at $23^x$, and advanced downwardly by a pushing pressure applied thereto sliding upon the inner surfaces of the conduit 23, and the inner surfaces of the branch 5 describing the curvature of the wall of the branch 5 moves to the face 15 of the partition 14, and, being prevented thereby from entering the opposite branch 4 slides downwardly and inwardly upon the sloping sides of said faces 15 to the wire guiding depression or slot 18 at the bottom of said slopes. When the advanced end of the fish-wire slides upon the inward slopes of the face 15 presented to said branch 5 the slopes of the said face 15 deflect the wire downwardly and inwardly to the wire guiding depression or slot 18 which is generally followed downwardly, being a path of least resistance for the fish-wire, and sliding in the crotch formed by the side portions 20 or upon said side portions and guided thereby continues centrally downwardly to the opening in the conduit 21, as at $21^x$, where the feed-wire is attached to the fish-wire and pulled through the fitting to the point where the fish-wire was introduced. When the feed-wire, not shown, is attached to the fish-wire the same is pulled through the conduits 21 and 23 connected with the fitting sliding upon the inner surfaces thereof and upon the bearings 13 upon the butting shoulders 10, 11 and 12 under which shoulders the conduits are housed, and upon the side portions 20 upon the partition 14. The method is identically the same when fishing for a feed-wire through the opposite branch.

The fitting described is adapted for connecting lateral conduits with main conduits concealed in earth or in the walls of buildings, and effects a saving in conduit sections and junction-boxes and other opening devices necessary in conduit systems having lateral branches. Moreover, the interior arrangement and form of the fitting permits of the expeditious and unobstructed passage of the fish-wire therethrough, and the pulling therein of a feed-wire without injury to the insulation thereon, and independent of any external opening providing access to the fitting.

While I show and describe the duplex branches of the fitting outwardly extended from the neck 3 in curved lines, it is obvious that the said branches may be extended upon any practical line or one branch extended in vertical line with the said neck, and the other branch extended in a curved line without departing from my invention.

Having described my invention, I claim:

1. In a T-fitting for electrical conduits, a dividing and wire guiding partition formed by the outwardly curved walls of the branches continued inwardly to a juncture provided integrally in the lower extremity with downwardly extending receding wire guiding portions, the faces of said partition provided with inward sloping surfaces, and a longitudinal wire guiding depression or slot centrally in said faces dividing said sloping surfaces and communicating with said side portions.

2. In a T-fitting for electrical conduits, a dividing and guiding partition formed by the outwardly curved walls of the branches continued inwardly to a juncture provided integrally in the lower extremity with downwardly extending receding wire guiding side portions, the opposing faces of said partitions divided into inwardly extending side slopes communicating with inward slopes on said side portions.

3. A T-fitting for electrical conduits consisting of the main member 3, the branch members 4 5, the partition 14, the side portions 20, extended from the lower extremity of said partition 14, the faces 15, provided with inward sloping surfaces, and the wire guiding depression or slot 18, centrally dividing the faces 15 and communicating with the borders of said side portions 20.

GUSTAVE H. SCHWEDLER.

Witnesses:
    Mrs. J. H. Nulf,
    Iva Young.